United States Patent
Badic et al.

(10) Patent No.: US 12,388,907 B2
(45) Date of Patent: Aug. 12, 2025

(54) CONNECTIONS AGGREGATION AMONG RELATED DEVICES FOR EDGE COMPUTING

(71) Applicant: APPLE INC., Cupertino, CA (US)

(72) Inventors: Biljana Badic, Munich (DE); Babar Qaisrani, Issaquah, WA (US); Bernd W. Adler, San Jose, CA (US); Christian Drewes, Germering (DE); Matthias Sauer, San Jose, CA (US); Mikhail Wilhelm, Munich (DE); Sabine Roessel, Munich (DE)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 17/991,551

(22) Filed: Nov. 21, 2022

(65) Prior Publication Data
US 2023/0199084 A1 Jun. 22, 2023

Related U.S. Application Data

(60) Provisional application No. 63/265,831, filed on Dec. 21, 2021.

(51) Int. Cl.
| | | |
|---|---|---|
| G06F 15/16 | (2006.01) | |
| G06F 9/54 | (2006.01) | |
| H04L 29/06 | (2006.01) | |
| H04L 67/566 | (2022.01) | |

(52) U.S. Cl.
CPC ................................ H04L 67/566 (2022.05)

(58) Field of Classification Search
CPC .................................................... H04L 67/566

USPC ............................................. 709/223; 726/23
See application file for complete search history.

(56) References Cited

U.S. PATENT DOCUMENTS

| | | | | |
|---|---|---|---|---|
| 9,258,335 | B1* | 2/2016 | Taylor | H04W 4/38 |
| 11,736,585 | B2* | 8/2023 | Perng | H04L 67/133 |
| | | | | 709/227 |
| 11,899,685 | B1* | 2/2024 | Pandis | G06F 16/27 |
| 12,167,264 | B1* | 12/2024 | McEvilly | H04L 43/0876 |
| 2007/0291702 | A1* | 12/2007 | Nanba | H04J 3/00 |
| | | | | 370/336 |
| 2010/0250648 | A1* | 9/2010 | Cao | H04L 67/1001 |
| | | | | 709/219 |
| 2020/0178198 | A1 | 6/2020 | Ding et al. | |
| 2020/0269132 | A1* | 8/2020 | Turner | H04L 67/10 |
| 2021/0287323 | A1* | 9/2021 | Barton | G06F 9/5038 |

(Continued)

FOREIGN PATENT DOCUMENTS

CN 110933134 A 3/2020

OTHER PUBLICATIONS

Suresh Chitturi, SA6—Accelerating 5G Application Standards!, 3GPP SA6, GSMA OPG—Oct. 26, 2020 in 23 pages.

(Continued)

*Primary Examiner* — Hamza N Algibhah
(74) *Attorney, Agent, or Firm* — Kilpatrick Townsend & Stockton LLP

(57) ABSTRACT

The present application relates to devices and components including apparatus, systems, and methods for connections aggregation among related devices for edge computing. Such techniques may include a grouping of related devices as an edge group, and assignment of a proxy device for distribution of edge server discovery information among the edge group.

17 Claims, 14 Drawing Sheets

(56) References Cited

U.S. PATENT DOCUMENTS

| | | | |
|---|---|---|---|
| 2021/0306281 A1 | 9/2021 | Vilgelm et al. | |
| 2022/0014423 A1* | 1/2022 | Smith | H04L 41/0894 |
| 2022/0109622 A1* | 4/2022 | Yeh | H04L 69/40 |
| 2022/0366494 A1* | 11/2022 | Cella | H04L 9/50 |
| 2023/0073863 A1* | 3/2023 | Nicoara | H04L 67/1097 |
| 2023/0198765 A1* | 6/2023 | Holmes-Mitra | H04L 9/0863 |
| | | | 713/189 |
| 2024/0187502 A1* | 6/2024 | Christner | H04L 69/04 |
| 2024/0288325 A1* | 8/2024 | Maes | G01L 19/04 |
| 2024/0414067 A1* | 12/2024 | Yao | H04L 41/16 |

OTHER PUBLICATIONS

Suresh Chitturi, 3GPP SA6 Edgeapp—Architecture for enabling Edge Applications, 5G Vertical User Webinar Series, 3GPP SA6, 3GPP Edge Computing Standards SA6 Edgeapp—Apr. 22, 2021 in 13 pages.

Pham et al., A Survey of Multi-Access Edge Computing in 5G and Beyond: Fundamentals, Technology Integration, and State-of-the-Art, IEEE Communications Surveys and Tutorials, arXiv:1906.08452v2 [cs.NI] Jan. 2, 2020 in 43 pages.

3rd Generation Partnership Project; Technical Specification Group Services and System Aspects; 5G System Enhancements for Edge Computing; Stage 2 (Release 17), Technical Specification, 3GPP TS 23.548 V17.0.0 (Sep. 2021) in 52 pages.

3rd Generation Partnership Project; Technical Specification Group Services and System Aspects; Architecture for enabling Edge Applications; (Release 17), Technical Specification, 3GPP TS 23.558 V17.1.0 (Sep. 2021) in 162 pages [cited for sections 4.4, 6.2, and 8.3].

3rd Generation Partnership Project; Technical Specification Group Services and System Aspects; Study on enhancement of support for Edge Computing in 5G Core network (5GC) (Release 17), Technical Specification, 3GPP TR 23.748 V17.0.0 (Dec. 2020) in 250 pages [cited for sections 5.1, 6.1.2, 6.2.3, and 6.3.1].

Shen et al., White Paper: Cloud Interfacing at the Telco 5G Edge, 1st edition—Sep. 2020, Akraino, in 25 pages.

Jun, et al., Ultra-low-latency services in 5G systems: A perspective from 3GPP standards, ETRI Journal, 2020;42(5):721-733, Special Issue, Received: May 9, 2020 | Revised: Aug. 15, 2020 | Accepted: Sep. 10, 2020, Wiley, in 13 pages.

Kekki, et al., MEC in 5G networks, ETSI White Paper No. 28, First edition—Jun. 2018, ISBN No. 979-10-92620-22-1 in 28 pages.

Sprecher, et al., Harmonizing standards for edge computing—A synergized architecture leveraging ETSI ISG MEC and 3GPP specifications, ETSI White Paper #36, 1st edition—Jul. 2020 in 14 pages.

European Telecommunications Standards Institute (ETSI), Group Specification: Multi-access Edge Computing (MEC); Phase 2: Use Cases and Requirements, ETSI GS MEC 002 V2.1.1 (Oct. 2018), Reference No. RGS/MEC-0002v211TechReq in 66 pages.

European Telecommunications Standards Institute (ETSI), Group Specification: Mobile Edge Computing (MEC); General principles for Mobile Edge Service APIs, ETSI GS MEC 009 V1.1.1 (Jul. 2017), Reference No. DGS/MEC-0009ApiPrinciples in 55 pages.

Patel, et al., Mobile-Edge Computing, Mobile-Edge Computing—Introductory Technical White Paper, Issue 1, Publication date: Sep. 2014, printed from https://portal.etsi.org/portals/0/tbpages/mec/docs/mobile-edge_computing_-_introductory_technical_white_paper_v1%2018-09-14.pdf, in 36 pages.

Gupta, et al., Mobile Edge Computing—an important ingredient of 5G Networks, IEEE Softwarization Newsletter, Mar. 2016, printed from https://www.researchgate.net/publication/320108305_Mobile_Edge_Computing_-an_important_ingredient_of_5G_Networks.pdf, in 5 pages.

China Patent Application No. 202211564475.4, Office Action, May 31, 2025, 10 pages.

* cited by examiner

CONNECTIONS AGGREGATION AMONG RELATED DEVICES FOR EDGE COMPUTING

CROSS-REFERENCE TO RELATED APPLICATIONS

This application claims the benefit of and priority to U.S. Provisional Application No. 63/265,831 filed on Dec. 21, 2021 and titled "CONNECTIONS AGGREGATION AMONG RELATED DEVICES FOR EDGE COMPUTING," the contents of which is herein incorporated by reference in its entirety for all purposes.

BACKGROUND

Despite the rapid technological evolution of personal devices, such as mobile user equipment (UE), computationally demanding applications on such devices may still by constrained by limited battery capacity, thermal limits and device cost considerations. In light of such problems and to minimize latency, it may be desired to offload computationally complex processing to servers located at the "network edge" (e.g., physically closer to an end-user device, as compared to a centralized server in a remote cloud computing facility).

DETAILED DESCRIPTION

Figure 1:
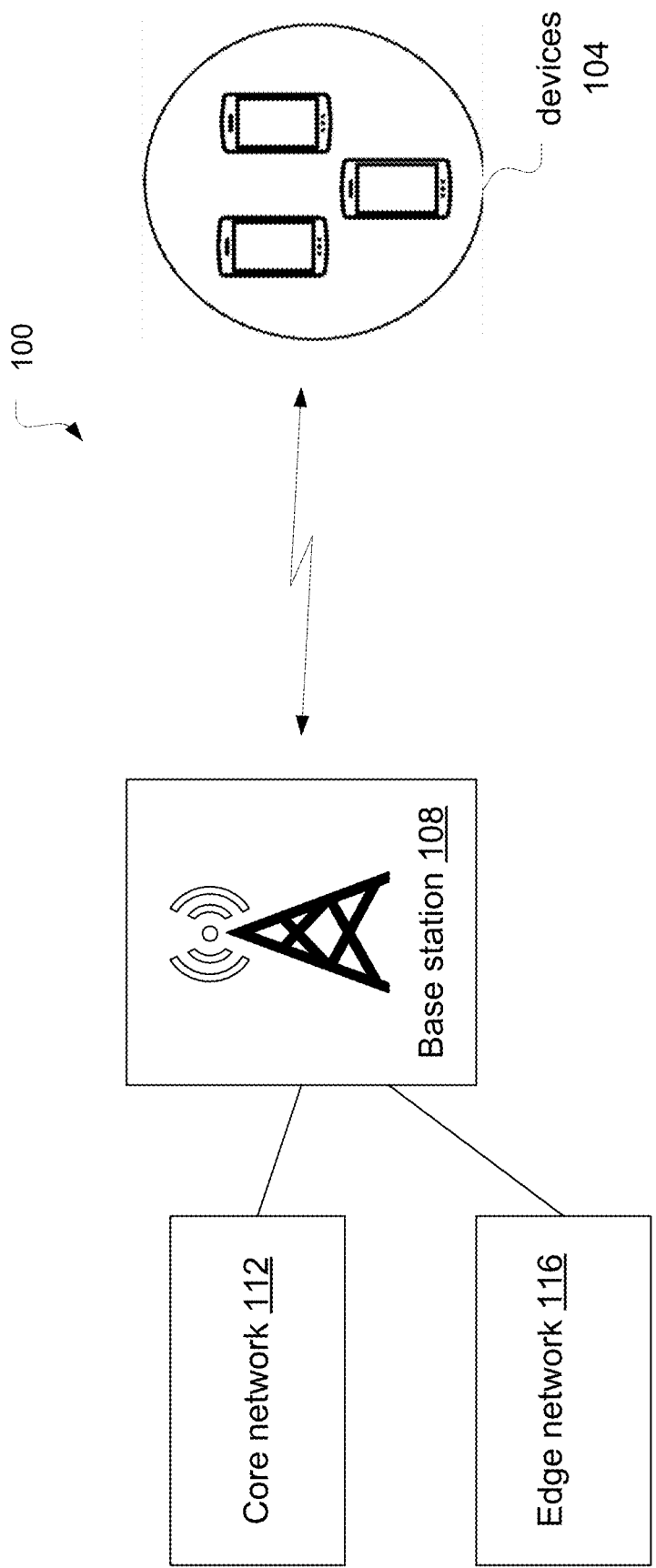
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). For the purposes of the present document, the phrase "A is based on B" means "A is based on at least B."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point. The term "obtaining" is used to indicate any of its ordinary meanings, such as calculating, deriving, receiving (e.g., from another element or device), and/or retrieving (e.g., from memory/storage as described below).

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" (IE) refers to a structural element containing one or more fields. The term "field" refers to individual contents of an information element, or a data element that contains content. An information element may include one or more additional information elements.

Techniques for connections aggregation among related devices for edge computing are described herein, with respect to devices (e.g., user equipment) that may be configured to access edge computing resources via an access network (e.g., a RAN and/or a WiFi network). FIG. 1 illustrates a network environment 100 in accordance with some embodiments. The network environment 100 may include one or more UEs 104 and an access node (or "base station") 108. The base station 108 may provide one or more wireless serving cells (for example, 3GPP New Radio "NR" cells), through which the UEs 104 may communicate with the base station 108 (e.g., over an NR-Uu interface). In some aspects, the base station 108 is a Next Generation NodeB (gNB) that provides one or more 3GPP NR cells.

The base station 108 may communicate with a core network 112 (e.g., over a 5G N2 (control plane) interface). The base station 108 may also communicate with an edge network 116 (e.g., over a 5G N3 (user plane) interface).

The overall average of the number of devices linked to the same user has been increasing significantly over the last decade. It has been estimated that the current global density of network-connected devices has already exceeded six per person. This estimate implies that, with a total world population of over 7.5 billion people, nearly fifty billion network-connected devices are already in service. The explosive proliferation of network-connected devices (e.g., Internet of Things (IoT), smartphones, wearables, etc.), along with new applications that require real-time computing power, continue to drive edge-computing systems.

Mobile Edge Computing (MEC) is a network architecture concept for providing an information technology (IT) service environment and cloud computing capabilities at the edge of a mobile network, within the radio access network (RAN) and in close proximity to mobile subscribers. Within such an architecture, specific user requests may be managed locally (e.g., directly at the network edge), instead of forwarding all traffic to remote Internet services. MEC promises significant reduction in latency and mobile energy consumption while delivering highly reliable and sophisticated services.

Edge server and edge services discovery (e.g., discovery of edge application server) is a key challenge for devices that use edge computing. As many devices attempt to connect to an edge server or to use edge services, an enormous number of connections may be generated and a large amount of data may be exchanged to establish the links between the devices and the edge, which may induce higher latency in the system and, as a result, higher energy consumption. It may be desired to achieve a pervasive behavior for such devices, particularly for devices that all belong to the same person. In addition, it may be desired to keep the latency and energy consumption low. Another challenge in such a complex system is how to optimally exploit the amount of still-existing connections for a single person or a group of people.

In light of such challenges, a framework as described herein may reduce the number of connection attempts between a single user and an edge network; offer a seamless services and server discovery in an edge network for devices belonging to a single person regardless of device capability; and/or optimize the number of existing and efficient connection according to application requirements, if the link aggregation is not feasible under certain conditions (e.g., user preferences).

Figure 2:
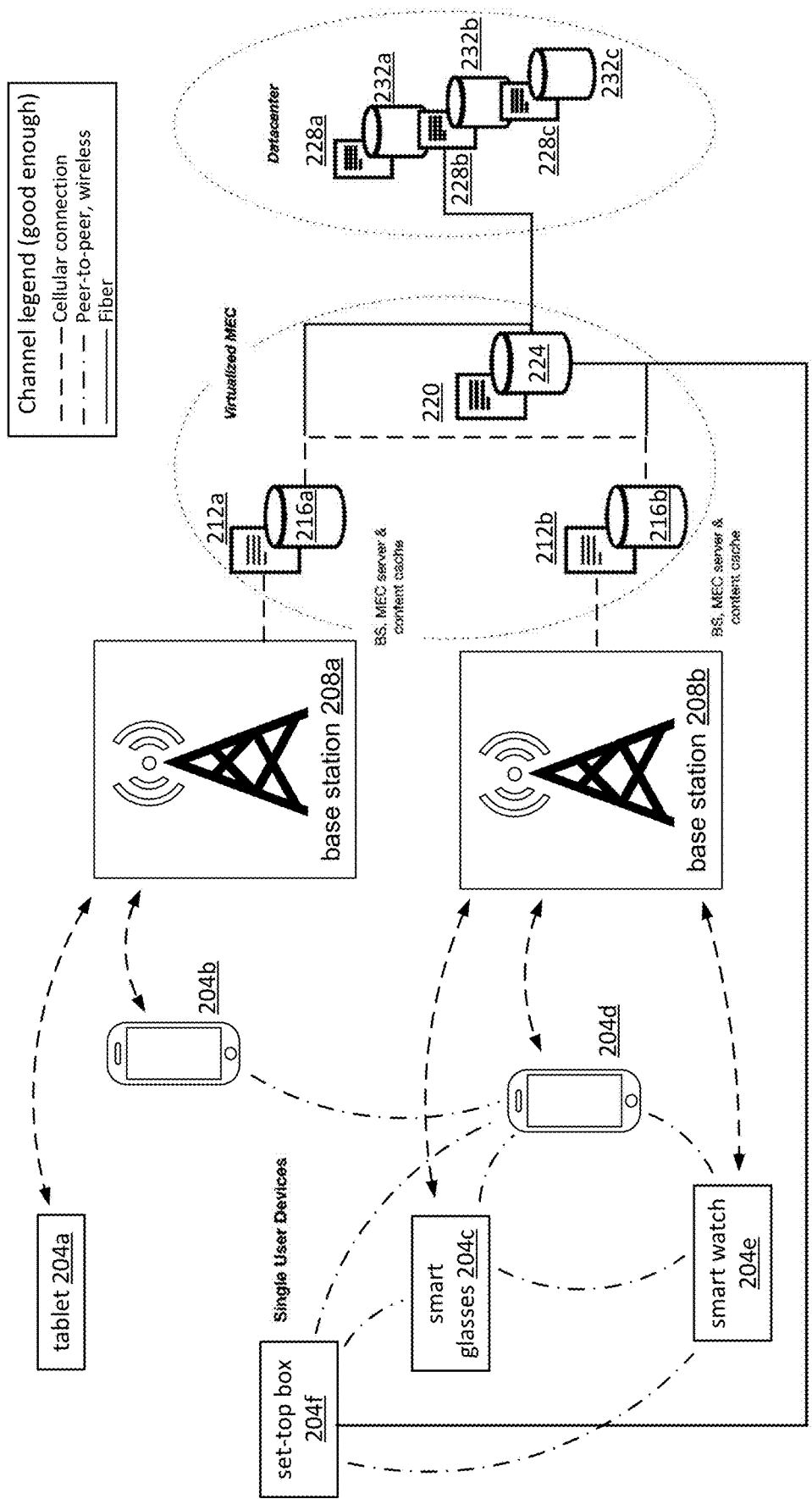
FIG. 2 shows an example of a connectivity situation within a wireless distributed system according to some embodiments.

FIG. 2 shows an example of a connectivity situation within a wireless distributed system that includes an edge network (e.g., a virtualized MEC including one or more servers 216a, 216b, and 224 and one or more content caches 212a, 212b, and 220) and a data network (e.g., a datacenter including one or more servers 232a, 232b, and 232c and one or more content caches 228a, 228b, and 228c). A user may be equipped with a single device that attempts to connect to edge servers. Alternatively, the user may be equipped with multiple devices that may simultaneously or non-simultaneously attempt to connect to edge servers (e.g., for data offloading (e.g., computation offloading) and/or to use edge network services). As shown in the example of FIG. 2, such multiple devices may include one or more user equipments (UEs) that access the edge network via a cellular connection with a RAN (e.g., via base station 208a and/or 208b). Such devices may include one or more of a tablet (e.g., tablet 204a); a smartphone (e.g., smartphones 204b and 204d); and/or a wearable (e.g., smart glasses 204c, smart watch 204e). The multiple devices may also include one or more devices whose location is potentially fixed and which has a wired (e.g., optical fiber) connection (e.g., a high-speed Internet landline) to the edge network and/or to a data network, such as a streaming set-top box 204f (shown with an associated remote control). One or more of the multiple devices may also communicate with one another over a wireless (e.g., peer-to-peer) connection, such as, for example, WiFi, or Bluetooth™ or another short-range protocol.

A key bottleneck of a system as depicted in FIG. 2 may be increased latency, a higher number of connections (or connection attempts), and/or unnecessary computation in the entire network originating from a single user. In addition to such issues, such a system fails to exploit the diversity of a multitude of good connections to devices of a single person or to devices of a group of individuals.

A framework according to one or more of the examples described herein may reduce bandwidth usage at a user's home network and/or reduce signalling flow/connection attempts between user equipments and edge network/services. For example, techniques disclosed herein include a framework in which the number of connection attempts to an edge server may be significantly reduced and/or optimized while still enabling seamless service discovery and execution. A number of devices that are related in some manner (e.g., all belonging to a single user, or in physical proximity to each other) are grouped to form an "edge group." Within each edge group, a device is selected (e.g., according to pre-defined criteria and/or current user circumstances) to serve as a proxy device. Proxy services may include participation in edge server and services discovery and/or distribution of basic discovery information in form of metadata (e.g., a metadata file or "metafile") to other devices in the edge group. After receiving the metadata from the proxy device, the other devices in the edge group may connect to an edge server or to edge services if needed; otherwise they may remain in a silent mode.

The grouping of devices into an edge group, the selection (and possible re-selection) of a proxy device, and (if needed) link optimizations and adaptations may be managed through a dedicated edge entity (called an "edge group services entity") that may be part of a core network or part of an edge network. According to an approach as described in this example, connections from a number of devices toward the edge network and core network may be aggregated together, which may significantly reduce overload and/or network congestion. In such manner, the number of discovery and connection attempts towards the edge network may be reduced within a seamless edge server and services discovery framework. In a further example, a proxy device may be configured to switch to its virtual replica device located in an edge group, in the case of limited computational capability and memory.

Figure 3:
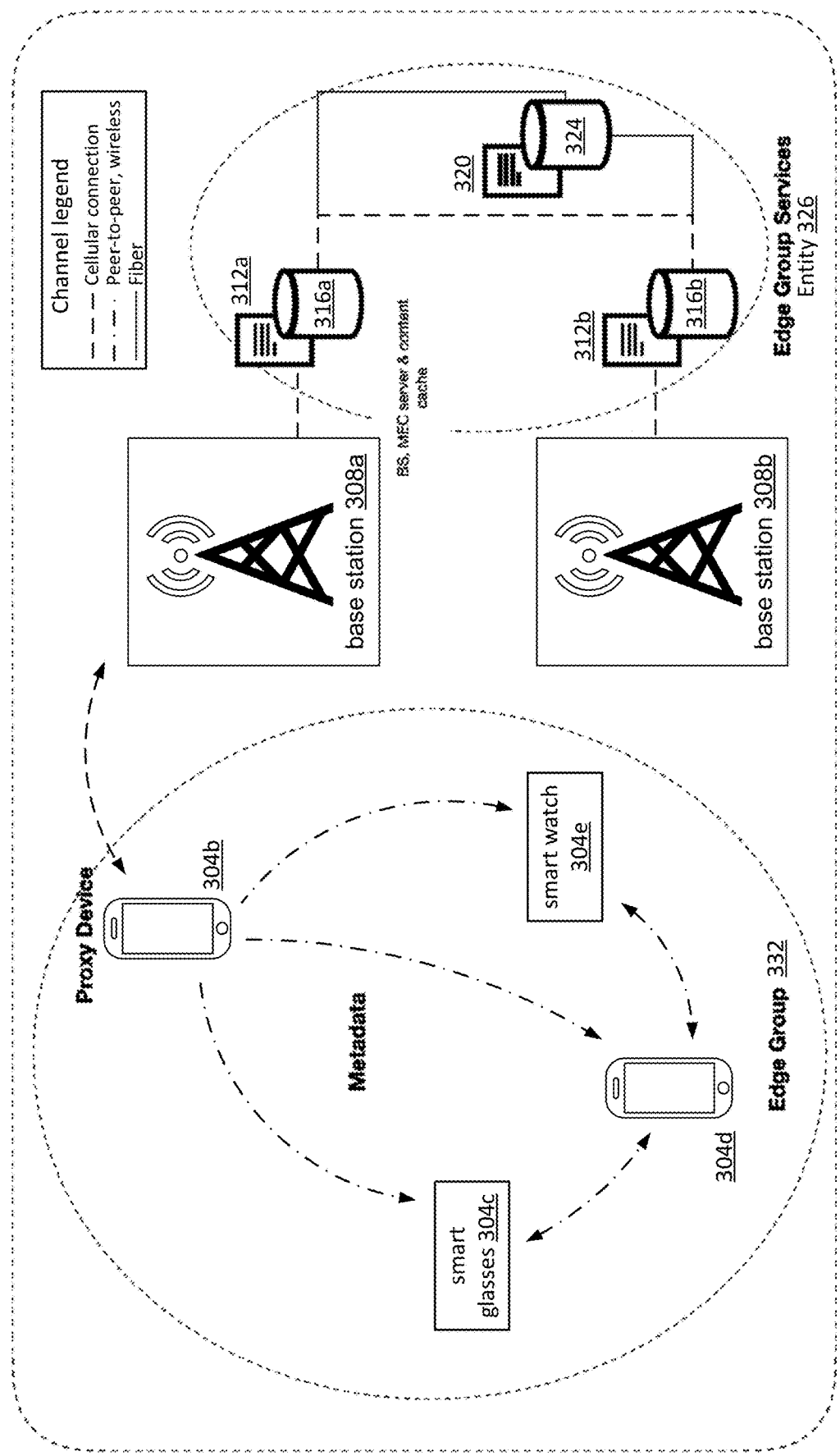
FIG. 3 shows an example of a framework according to some embodiments.

FIG. 3 shows an example of a framework as described herein that includes three major entities: a) an edge group services entity 326 (which may execute on one or more of edge network servers 316a, 316b, and 324), b) a proxy device (in this example, smartphone 304b), and c) an edge group 332 that includes the proxy device 304b and other devices (in this example, smart glasses 304c, smartphone 304d, and smart watch 304e). The edge group services entity 326 is responsible for management and control of one or more edge groups and their corresponding proxy devices (e.g., edge group 332 and its proxy device 304b). The edge group services entity 326 may provide a secure service environment in which edge-computing-aware devices (e.g., several or all devices of a user, such as one or more of devices 304b, 304c, 304d, and 304e) may be registered and authenticated. The edge group services entity 326 may collect and actively leverage information on expected throughput, latency, user behavior and/or available edge services to select the best proxy device available at runtime.

The edge group services entity 326 may include an Information Control Function (ICF) that may control information to be shared with other devices; interact with one or more access networks (e.g., a RAN, a home network, and/or a WiFi network) to obtain information on link quality; and/or interact with the edge network to monitor local services and availability of the edge network.

An edge group services entity may be implemented in any of several different ways. In one example, the edge group services entity may be implemented as a part of the core network (CN). In this case, the edge group services entity may interact with the gNB (e.g., base station 308a and/or 308b) via a user plane function (UPF). In another example, the edge group services entity may be part of the Edge Network development and may interact with the CN via an application function (AF) and/or a network exposure function (NEF). In a further example, the edge group services entity may be part of a local network (e.g., a WiFi network) and may interact with one or more access points (APs) (e.g., via a dedicated interface).

Based on instructions and rules that may be defined, for example, at edge services, several devices may be grouped together as an edge group. An edge group may be organized by edge group services based on, for example, information provided by a user (e.g., relationship, capability, distance, etc). Different types of edge group may be organized (depending on, for example, a relationship and/or a distance among the devices in the edge group), and examples of four different types of edge group are discussed below with reference to FIG. 5. For example, the devices within one edge group may all belong to a single person, the devices within another edge group may belong to persons who have been associated as a group (e.g., a family and/or friends), and the devices within a further edge group may be related by physical proximity. An edge group may be limited to devices within a certain proximity of one another (e.g., a range of a short-range protocol, such as Bluetooth™).

The proxy device may be the only device within its edge group that participates in edge server and/or service discovery. For example, the proxy device may be the only device within the edge group that interacts with Edge Services. The proxy device serves as a main link to the edge services and applications, and any other links toward the edge by other devices within the edge group may be discontinued or may enter a sleep mode (e.g., unless actively engaged in offloading to the edge network). An edge group may include a single proxy device at a time, although different devices within an edge group may serve as the proxy device for the edge group at different times (e.g., according to changes in link quality conditions).

In one example, the proxy device is a device that has high connectivity and/or computational capabilities (e.g., the highest computational capabilities among the devices in the edge group). In another example, the proxy device is a single device with less computing and battery power (e.g., a smart watch or other wearable, a low-cost phone, etc.). In this case, the proxy device may be a device that could benefit from edge computing, such as a thin device or other device with limited computational capability.

In a further example, the proxy device may be selected according to application criteria. For example, the proxy device may be dynamically selected by edge group services among other devices in the edge group based on, e.g., current link and application requirements (e.g., application data rate and latency requirements) and/or channel quality towards edge server (e.g., reference signal received power (RSRP) level). In another example, the proxy device may be selected in advance among the devices in the edge group (e.g., by the user, a parent, or a VIP) and registered in advance with edge group services. The proxy device may be directly selected by the user and/or may be selected by the user's behavior. For example, the proxy device may be a preferred device, such as the device that the user uses most often (e.g., a smartphone that is always selected as the proxy device over a streaming set-top box or a tablet within the same edge group).

The proxy device may provide desired requirements to the edge group services entity to achieve optimal offloading. For example, the proxy device may be configured to signal a desired modulation, rate, and/or transmit power that would be required under current channel conditions to successfully offload an application. Finally, the edge group services entity may negotiate those requirements with the network provider.

Figure 4:
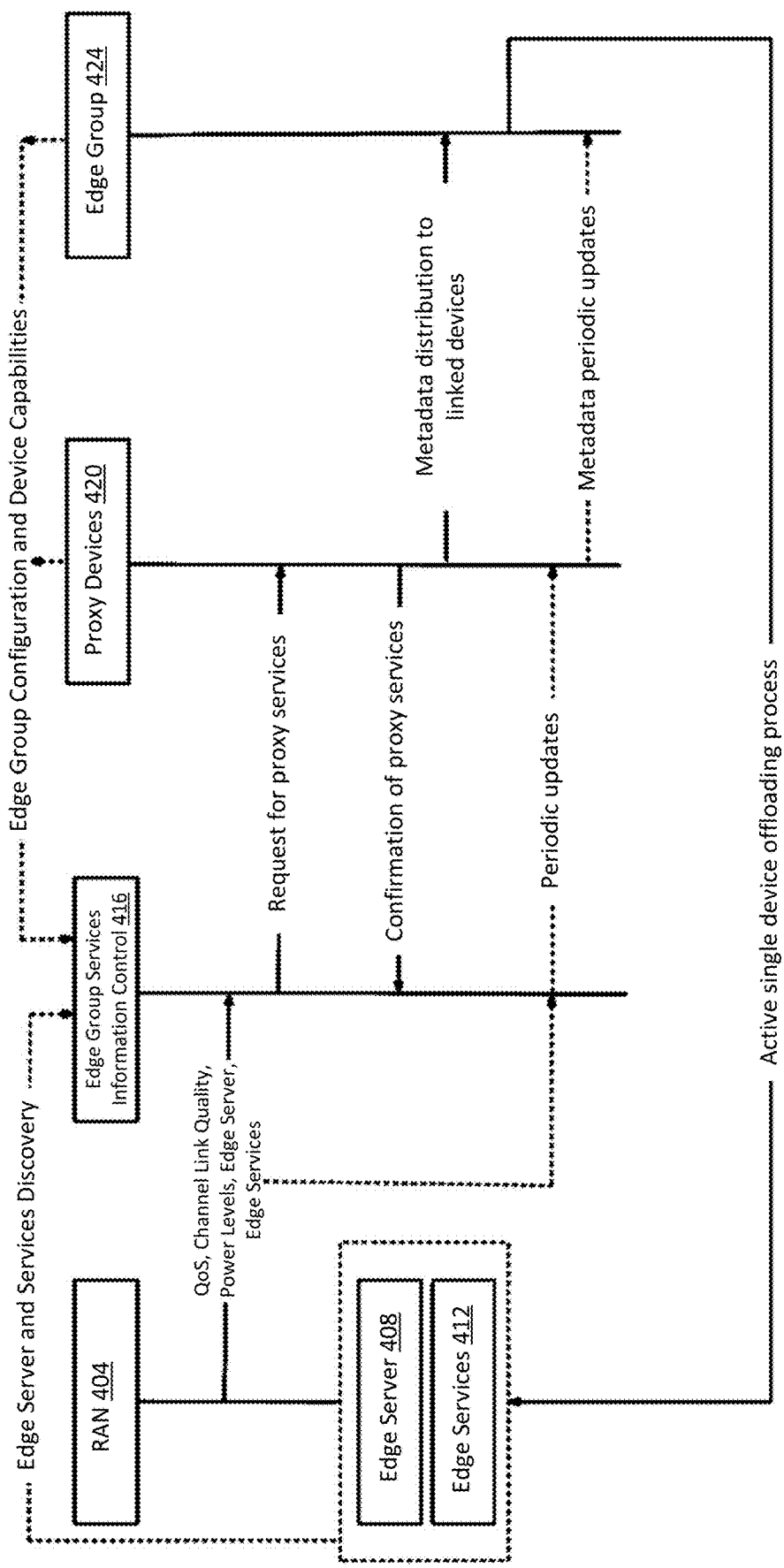
FIG. 4 shows an example of a signaling flow among the entities of a framework according to some embodiments.

FIG. 4 shows an example of a signaling flow among the entities of a framework that includes a RAN 404, an edge server (e.g., an edge application server) 408, edge services 412, an ICF 416, a proxy device 420, and an edge group 424. Within such a framework, the proxy device 420 may perform discovery of edge servers and share information obtained from edge servers to its linked devices. In another example, the proxy device 420 may perform edge services discovery and share information from providers of edge services to its linked devices. In a further example, the edge group services entity (e.g., ICF 416) may perform discovery of edge servers and provide resulting connection information to the proxy device 420 (e.g., in the form of edge group metadata as described below). In another example, the edge group may operate at an assigned network slice.

As shown in FIG. 4, ICF 416 may receive, from RAN 404, information relating to links to devices of the edge group, such as quality of service (QoS), channel link quality, and/or power levels. From the edge network, ICF 416 may also receive information relating to edge server 408 (e.g., IP address, port number, connectivity status, and/or capability (offloading)) and/or edge services 412 (e.g., type of resources, location, owner, and/or data distribution type).

For example, ICF 416 may send one or more edge server and/or edge services discovery requests. ICF 416 may also receive device capability information and/or edge group configuration information from one or more devices of the edge group 424.

Based on information received from RAN 404, the edge network, and/or one or more devices of the edge group, ICF 416 may select a device to serve as the proxy device 420 for the edge group 424. Alternatively or additionally, ICF 416 may select the proxy device 420 based on a user selection, which may be pre-registered. The ICF 416 may send a request for proxy services to the selected device 420. Proxy services may include participation in edge server and services discovery and/or distribution of basic discovery information in form of metadata (e.g., a metadata file) to other devices in the edge group. In response to the request, the selected device 420 may send a confirmation of proxy services to the ICF 416.

Information on edge server(s) and/or edge services is distributed to devices of an edge group in the form of edge group metadata (e.g., a metadata file). The edge group metadata may contain information on one or more edge servers, such as, e.g., IP address, port number, connectivity status, and/or capability (offloading). The edge group metadata may contain information on available edge services, such as, e.g., type of resources, location, owner, and/or data distribution type. Sharing only certain core information about functionality and its properties in such manner may help to keep data flow as small as possible.

In one example, upon confirmation of proxy services, the proxy device 420 participates in edge server and services discovery to acquire such edge server and/or services information, for distribution as edge group metadata to the other devices of the edge group. In another example, the proxy device 420 receives such edge server and/or services information from ICF 416 (e.g., in the form of edge group metadata or in another form) for distribution as edge group metadata to the other devices of the edge group. In such case, the information (e.g., metadata) may be sent with the request for proxy services (e.g., in a message that also includes the request for proxy services) or may be sent by the ICF after it receives the confirmation of proxy services. The ICF 416 may also issue periodic updates of the edge group metadata to the proxy device 420 (e.g., at an interval in the range of from several, ten, or thirty seconds to one or several minutes) for subsequent distribution among the devices of its edge group.

In one example, the edge group metadata is shared between the proxy device 420 and other devices in its edge group 424 via peer-to-peer communication, which may be enabled in user equipment. In another example, the edge group metadata is distributed among the devices in the edge group 424 by exploiting network coding (e.g., multiple replicas of the metadata are shared simultaneously to devices in the edge group). In a further example, a device that is out of reach of the proxy device of an edge group that is limited to devices belonging to the same person (e.g., a tablet that is located at home, while the proxy device is away from home) receives edge group metadata from the proxy device only if relevant for that typical device, and otherwise the proxy device does not share edge group metadata with that device at that time.

Devices that are members of an active edge group may be brought back from a sleep mode briefly (e.g., for a period in the range of from several or ten to twenty or fifty milliseconds) and regularly (e.g., at an interval in a range of from several seconds to several minutes) to enable updates of the link quality status. Based on the most recent link status, the Information Control Function may (or may not) re-assign the role of proxy device to another device of the same edge group.

A device of the edge group 424 may use information from the edge group metadata to access computing resources and/or services of the edge network. For example, the edge group metadata may include an IP address of the edge server 408 or of another edge server, and a device of the edge group may use the IP address to transmit a message to the edge server 408 or other edge server in order to initiate an edge computing connection (e.g., for computation offloading to the edge server and/or for communicating with an application executing on the edge server). It is possible for an edge computing connection between the edge network and a device of the edge group to use Dual Connectivity, in which the device maintains wireless connectivity towards two base stations (or one base station and one access point). Those base stations can operate different radio access technologies (e.g., 4G LTE and 5G NR), or control and data plane can be shared among the two base stations. Data packets are distributed across the two links, and re-ordering of the packets received from the two different links may be performed by higher layers (e.g., Packet Data Convergence Protocol or "PDCP").

Figure 5:
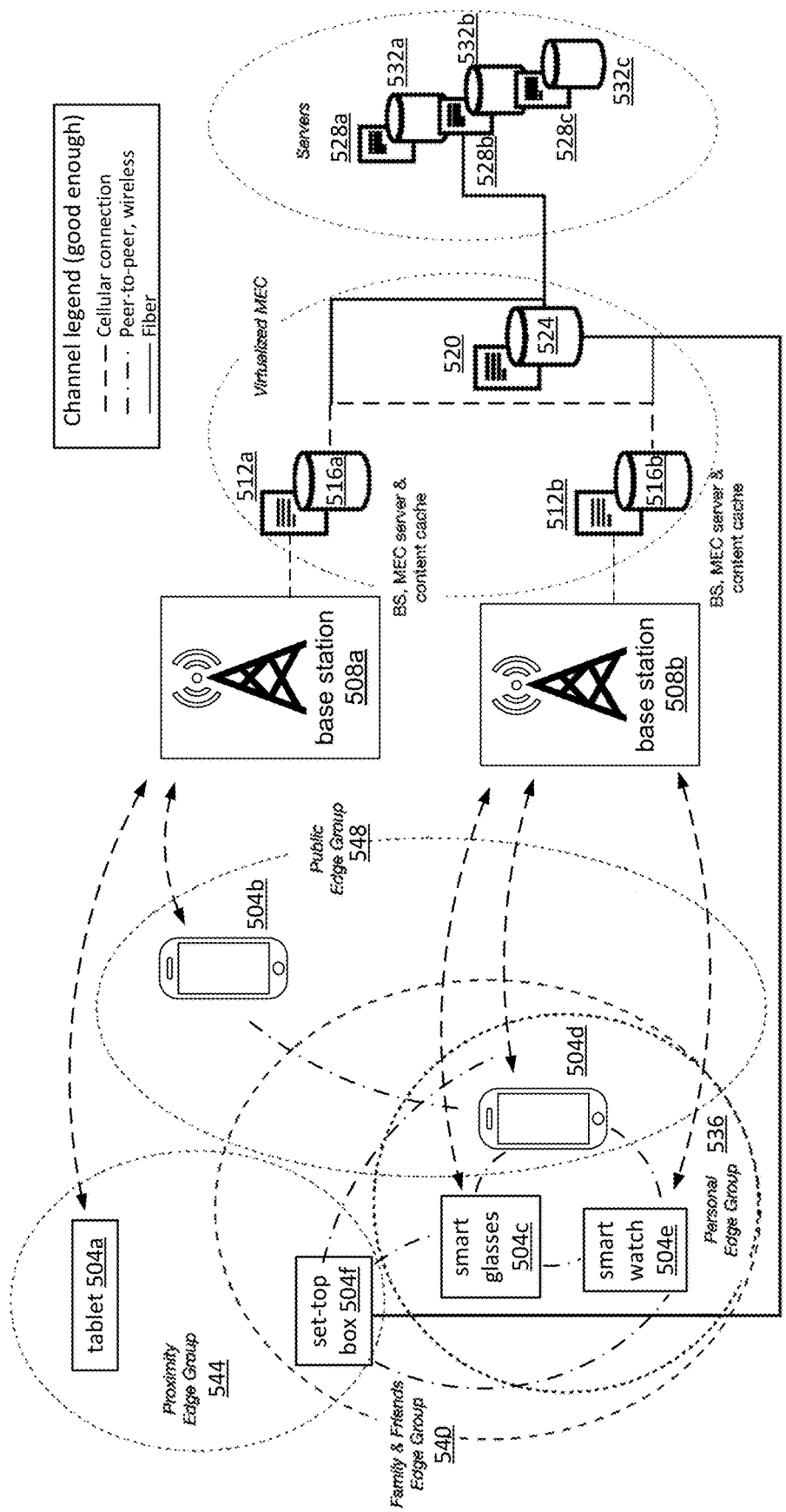
FIG. 5 illustrates examples of several different types of edge group according to some embodiments.

FIG. 5 illustrates an example in which delineations of several different types of edge group are overlaid onto the system of FIG. 2. (In FIG. 5, the labels 508a through 532c indicate elements of the same types as the corresponding labels 208a through 232c, respectively, as described above, and the labels 504a through 504e indicate devices of the same types as the corresponding labels 204a through 204e, respectively, as described above.) This example shows four different types of edge group, although additional different types of edge group may be organized (e.g., depending on the purpose and/or the relationship among the devices of the edge group). A first type of edge group (called a "personal edge group" or "personal devices edge group") may include only personal devices (e.g., devices that are all linked to the same user). In one example, a link between a device and a person may be indicated by an account identity that is used to authenticate access to the device (e.g., an Apple ID™). In FIG. 5, a personal edge group 536 that includes smart glasses 504c, smartphone 504d, and smart watch 504e is indicated by a dotted circle. Individually, these devices may potentially try to connect to the network simultaneously, and it may be desired to optimize the devices as an edge group to use only one cellular connection. For the personal edge group 536 as shown in FIG. 5, it may be desired to select the smartphone 504d as the proxy device, so that its cellular connection will be used; for example, the smart watch 504e with cellular connectivity may already default to such a configuration.

A second type of edge group (called a "family edge group," "buddies edge group," or "family & friends edge group") may include only trusted devices, such as wearables and/or portables of family members and friends. In FIG. 5, a family & friends edge group 540 as indicated by the dashed ellipse includes the devices of the personal edge group and also includes streaming set-top box 504f (which may be connected to a server 524 of a data network via a high-speed Internet landline).

A third type of edge group (called a "proximity-based edge group" or "proximity edge group") may include only devices that are in close proximity. In FIG. 5, a proximity edge group 544 as indicated by a dotted ellipse includes tablet 504a and streaming set-top box 504f. In one example, a proximity edge group may include devices of neighboring families that have teamed up to create the group (e.g., for shared connections for video streaming or other edge group services that are considered non-privacy-critical).

A fourth type of edge group (called an "open edge group" or "public edge group") may include any devices that are capable of content sharing. In FIG. 5, a public edge group 548 as indicated by a dotted ellipse includes smartphones 504b and 504d. A public edge group may be more volatile than an edge group of any of the three other types as described above. Due to device mobility, a public edge group may require more frequent reassignments of the proxy device role among its member devices than an edge group of another type.

Figure 6:
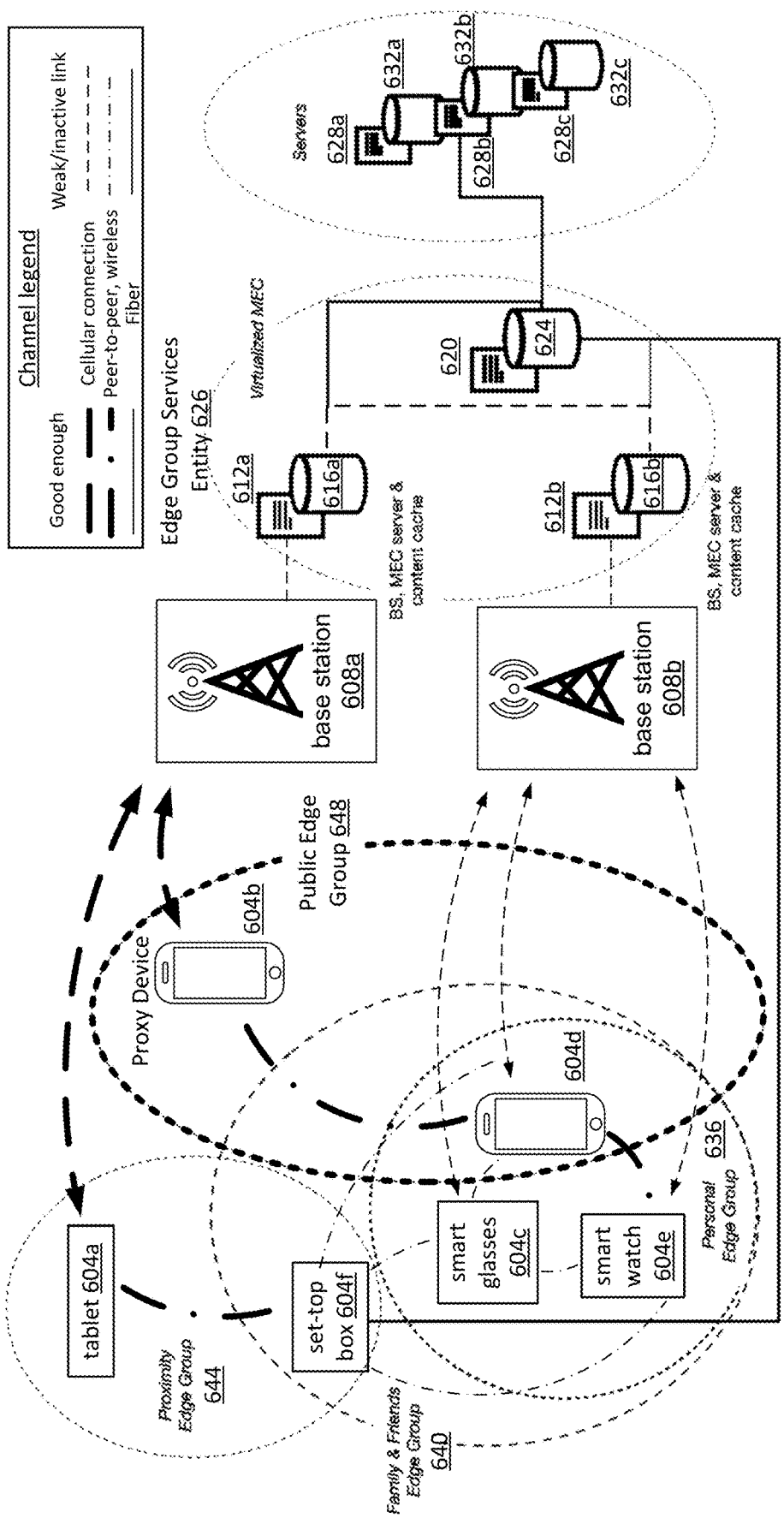
FIG. 6 shows an example of an active public edge group according to some embodiments.

FIG. 6 shows an example of an active public edge group 648 (indicated by the bold dotted ellipse and including smartphones 604b and 604d) and within this edge group, the currently assigned proxy device 604b. (In FIG. 6, the labels 604a through 604e indicate devices of the same types as the corresponding labels 204a through 204e, respectively, as described above; the labels 608a, 608b, and 628a through 632c indicate elements of the same types as the corresponding labels 208a, 208b, and 228a through 232c, respectively, as described above; the labels 612a through 624 indicate elements of the same types as the corresponding labels 312a through 324, respectively, as described above; and label 626 indicates an element of the same type as the corresponding label 326 as described above.) An interesting aspect is the overlap of edge groups of different types in this case. One or more other devices of the personal edge group 636 may benefit from public edge group 648. Additionally or alternatively, one or more other devices of the personal edge group 636 may intentionally not benefit from public edge group 648, at least for non-privacy- or non-security-critical services. In one example, the configuration of whether or not propagation of benefits in overlapping edge groups is supported may be flagged in the edge group metadata (e.g., in a services metafile).

A fifth type of edge group may include a single device (e.g., a thin device) with its virtual replica available at the edge server. In this example, the proxy device is the only device in its edge group, and it may be completely mirrored on an edge server (e.g., as a virtual replica device). A proxy device may be selected for such virtual replication due to capacity restrictions such as, for example, limited storage, limited computing resources, and/or fast-drained or otherwise limited battery power.

Figure 7:
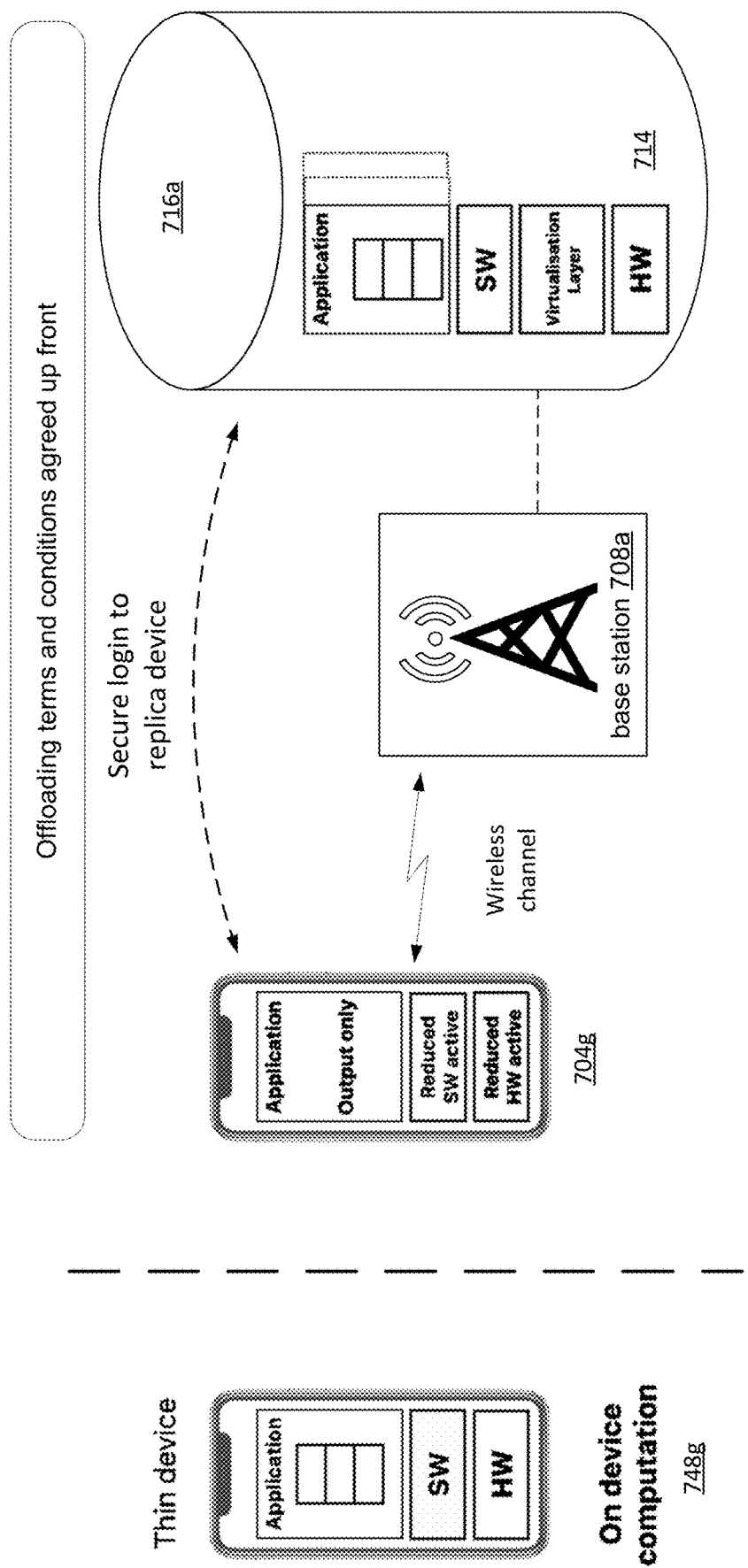
FIG. 7 shows an implementation example of a virtual replica edge group according to some embodiments.

FIG. 7 shows an implementation example of this type of edge group. The edge group services may define offloading terms and conditions to a proxy device 704g (e.g., a smart watch, a smartphone with limited computational capability, or other thin device). A virtual copy 714 of the proxy device 704g may be uploaded on the edge server 716a so that, for example, full offloading of all application and related software and hardware (e.g., a virtualization layer) is enabled at the edge. In this example, only the output of the application is shown on the user interface of the proxy device 704g (e.g., in contrast to the on-device computation as performed by the same device without such offloading, as shown at label 748g). It may be desired to configure the proxy device 704g to login into the virtual replica device (e.g., through secure authentication and via base station 708a) only on a per-need basis, which may lead to less use of computational resources and slower battery draining at proxy device 704g. The proxy device 704g may also consider wireless channel conditions before accessing the virtual replica device 714.

A framework according to one or more of the examples described herein may reduce the vast amount of connections per person, avoid control plane congestion, and/or offer means for device and network power savings. For scenarios in which the link reduction is not possible (e.g., all devices are active and using edge services), the proposed framework may be adjusted to maximize one or more system key performance indicators (KPIs), such as the overall throughput, security aspects, etc. In such case, instead of limiting active connections to the ones of the proxy devices, all links of an edge group may be kept active, and diversity of the multitude of links may be exploited. For example, the Information Control Function may collect information on application requirements and link conditions and optimize services' KPI(s) (e.g., with respect to data rate, latency, and/or security) by using multiple (possibly all) paths available through the edge group to the service endpoint device.

In one example, the ICF distributes compute capacity among devices of an edge group (e.g., within a Family & Friends edge group). Computational tasks that may be distributed among devices within a edge group may include, for example, large analytics tasks or media rendering tasks. The edge group metadata (e.g., a services metafile) may indicate the potential compute distribution type. For example, the metadata may include a flag that indicates either (a) offloading to the MEC server (which may be configured as a default) or (b) local compute distribution within the edge group.

Figure 8:
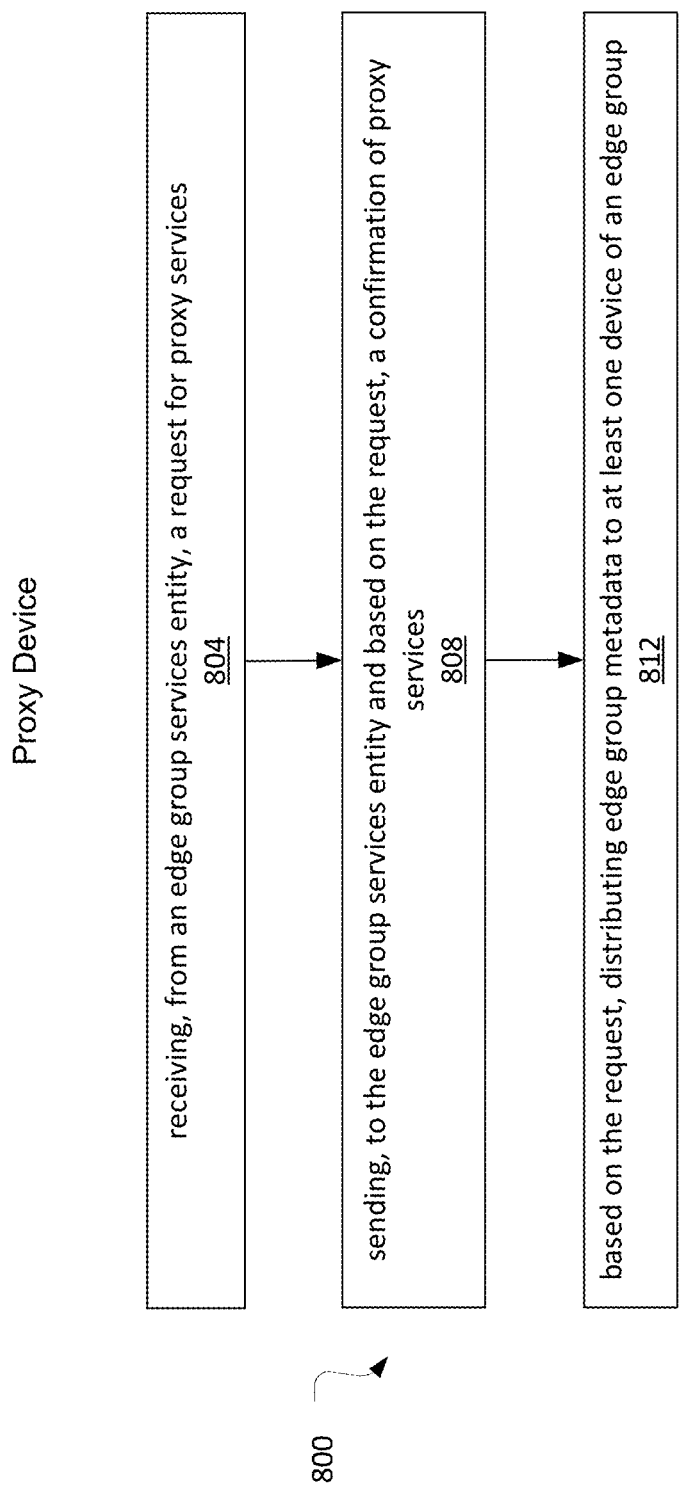
FIG. 8 illustrates an operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, any of UEs 104 or UE 1200; any of devices 204a-204e of FIG. 2, any of devices 304b-304e of FIG. 3, any of proxy device 420 or a device of edge group 424 of FIG. 4, any of devices 504a-504e of FIG. 5, any of devices 604a-604e of FIG. 6, or device 704g of FIG. 7; or components thereof, for example, baseband processor 1204A.

The operation flow/algorithmic structure 800 may include, at 804, receiving, from an edge group services entity, a request for proxy services. Receiving the request for proxy services may include receiving the request for proxy services within at least one transmission from a radio access network.

The operation flow/algorithmic structure 800 may include, at 808, sending, to the edge group services entity and based on the request, a confirmation of proxy services.

The operation flow/algorithmic structure 800 may include, at 812, based on the request, distributing edge group metadata to at least one device of an edge group. The edge group metadata may indicate at least one among an IP address of an edge server, a port number of an edge server, a connectivity status of an edge server, and an offloading capability of an edge server. The edge group metadata may indicate an IP address of an edge application server. Distributing the edge group metadata to the at least one device of the edge group may include sending the edge group metadata to the at least one device of the edge group over a peer-to-peer connection. Distributing the edge group metadata to the at least one device of the edge group may be performed using network coding.

The operation flow/algorithmic structure 800 may further include receiving, from the edge group services entity and subsequent to sending the confirmation of proxy services, the edge group metadata. In such case, receiving the edge group metadata may include receiving the edge group metadata within at least one transmission from a radio access network. Alternatively, the operation flow/algorithmic structure 800 may include receiving, from the edge group services entity, a message that includes the request for proxy services and the edge group metadata.

Figure 9:
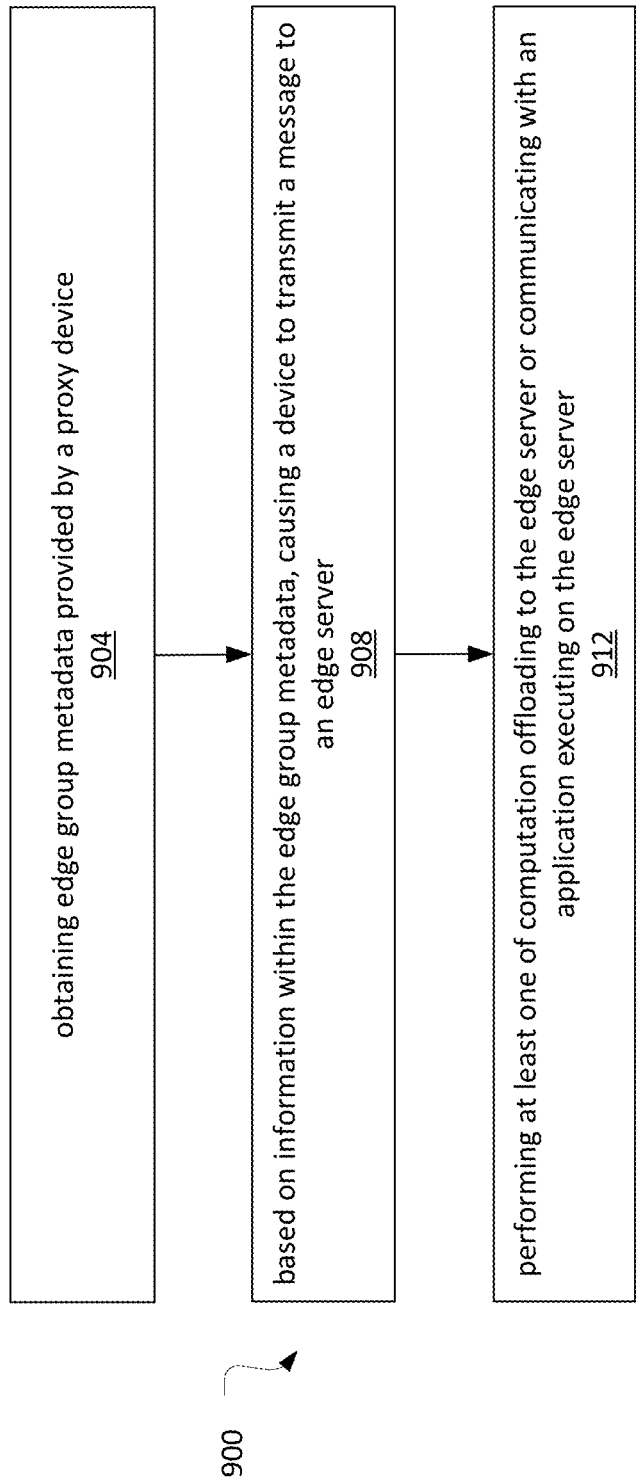
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by a UE such as, for example, any of UEs 104 or UE 1200; any of devices 204a-204e of FIG. 2, any of devices 304b-304e of FIG. 3, any of proxy device 420 or a device of edge group 424 of FIG. 4, any of devices 504a-504e of FIG. 5, any of devices 604a-604e of FIG. 6, or device 704g of FIG. 7; or components thereof, for example, baseband processor 1204A.

The operation flow/algorithmic structure 900 may include, at 904, obtaining edge group metadata provided by a proxy device. The edge group metadata may be obtained over a peer-to-peer connection. The edge group metadata may be obtained by network coding. The operation flow/algorithmic structure 900 may include obtaining periodic updates of the edge group metadata. The edge group metadata may indicate at least one among an Internet Protocol (IP) address of an edge server, a port number of an edge server, a connectivity status of an edge server, and an offloading capability of an edge server.

The operation flow/algorithmic structure 900 may include, at 908, based on information within the edge group metadata, causing a device to transmit a message to an edge server. The edge group metadata may indicate an Internet Protocol (IP) address of an edge application server, and the edge server may be the edge application server.

The operation flow/algorithmic structure 900 may include, at 912, performing at least one of computation offloading to the edge server or communicating with an application executing on the edge server. The operation flow/algorithmic structure 900 may further include providing, to an edge group services entity, an indication of a computational capability of the apparatus. Additionally or alternatively, the operation flow/algorithmic structure 900 may further include discontinuing a link to, and/or periodically awakening a link to, a second edge server.

Figure 10:
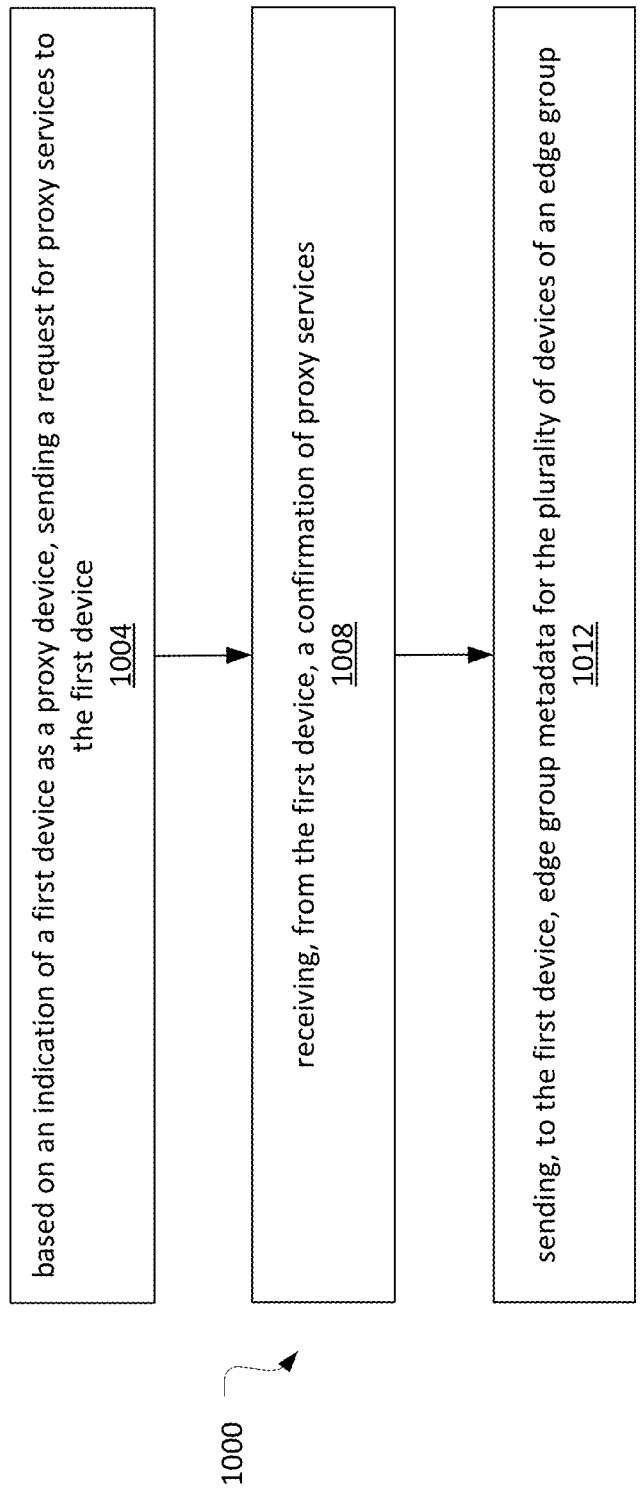
FIG. 10 illustrates an operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a server such as, for example, any of servers 216a, 216b, 224, 232a-c, 316a, 316b, 324, 408, 516a, 516b, 524, 532a-c, 616a, 616b, 624, 632a-c, or 716a; or components 1400; or one or more processors thereof, for example, processor 1414 or 1416.

The operation flow/algorithmic structure 1000 may include, at 1004, based on an indication of a first device as a proxy device, sending a request for proxy services to the first device. The operation flow/algorithmic structure 1000 may further include receiving, from a radio access network (RAN), link quality information for each of the plurality of devices of the edge group, the first device being among the plurality of devices, and based on the link quality information, generate the indication of the first device as a proxy device. The link quality information may be received from the RAN via a user plane function (UPF).

The operation flow/algorithmic structure 1000 may include, at 1008, receiving, from the first device, a confirmation of proxy services. The operation flow/algorithmic structure 1000 may include sending the edge group metadata to the first device after receiving the confirmation of proxy services.

The operation flow/algorithmic structure 1000 may include, at 1012, sending, to the first device, edge group metadata for the plurality of devices of an edge group. The edge group metadata may indicate at least one among an Internet Protocol (IP) address of an edge server, a port number of an edge server, a connectivity status of an edge server, and an offloading capability of an edge server. The edge group metadata may indicate an Internet Protocol (IP) address of an edge application server, and the operation flow/algorithmic structure 1000 may include receiving the IP address of the edge application server from a core network (CN) via an application function (AF) or a network exposure function (NEF). The operation flow/algorithmic structure 1000 may include receiving, from a CN, an indication that the plurality of devices of the edge group are commonly owned. The operation flow/algorithmic structure 1000 may include sending a message to the first device that includes the request for proxy services and the edge group metadata.

The operation flow/algorithmic structure 1000 may further include receiving, from the RAN, second link quality information for at least one of the plurality of devices of the edge group, and based on the second link quality information, send a request for proxy services to a second device among the plurality of devices of the edge group, the second device being different than the first device.

Figure 11:
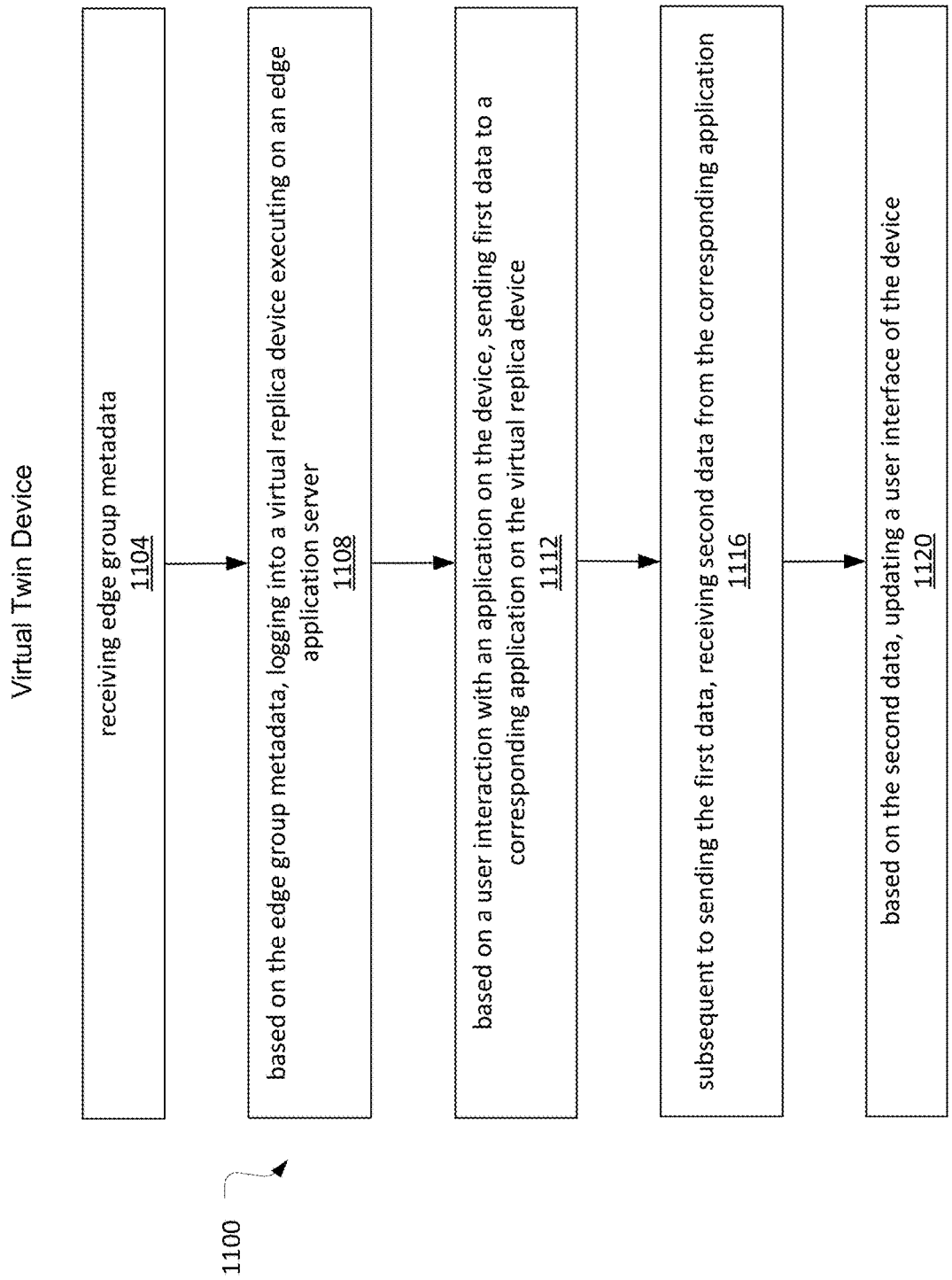
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a UE such as, for example, any of UEs 104 or UE 1200; any of devices 204*a*-204*e* of FIG. 2, any of devices 304*b*-304*e* of FIG. 3, any of proxy device 420 or a device of edge group 424 of FIG. 4, any of devices 504*a*-504*e* of FIG. 5, any of devices 604*a*-604*e* of FIG. 6, or device 704*g* of FIG. 7; or components thereof, for example, baseband processor 1204A.

The operation flow/algorithmic structure 1100 may include, at 1104, receiving edge group metadata. The edge group metadata may indicate at least one among an IP address of an edge server, a port number of an edge server, a connectivity status of an edge server, and an offloading capability of an edge server. In a particular example, the edge group metadata may indicate an IP address of the edge application server. The operation flow/algorithmic structure 1100 may include receiving the edge group metadata within at least one transmission from a radio access network The operation flow/algorithmic structure 1100 may include, at 1108, based on the edge group metadata, logging into a virtual replica device executing on an edge application server. The operation flow/algorithmic structure 1100 may further include, prior to logging into the virtual replica device, sending a request for computation offloading to the edge application server.

The operation flow/algorithmic structure 1100 may include, at 1112, based on a user interaction with an application on the device, sending first data to a corresponding application on the virtual replica device.

The operation flow/algorithmic structure 1100 may include, at 1116, subsequent to sending the first data, receiving second data from the corresponding application.

The operation flow/algorithmic structure 1100 may include, at 1120, based on the second data, updating a user interface of the device.

Figure 12:
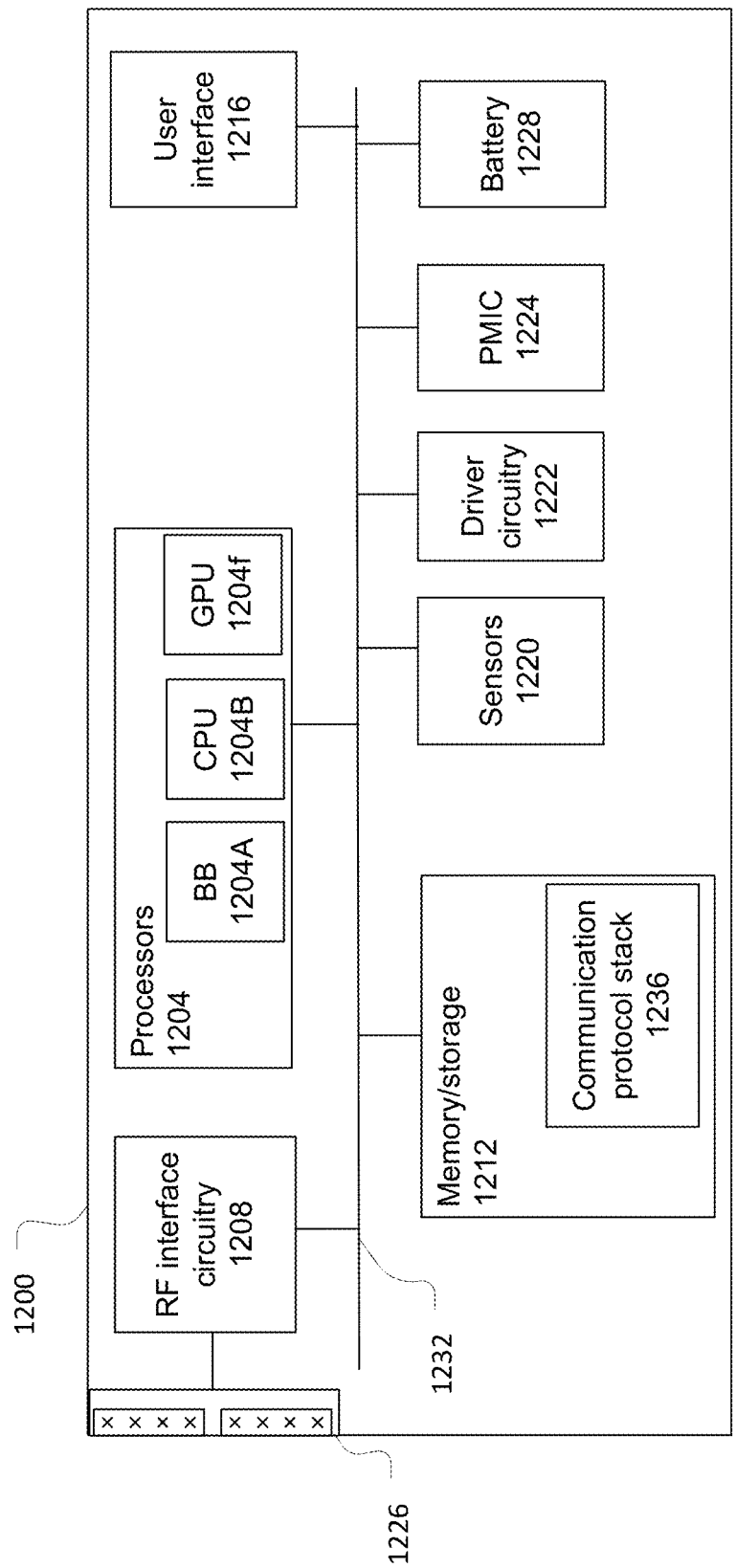
FIG. 12 illustrates a user equipment in accordance with some embodiments.

FIG. 12 illustrates a UE 1200 in accordance with some embodiments. The UE 1200 may be similar to and substantially interchangeable with any of UEs 104 of FIG. 1, any of devices 204*a*-204*e* of FIG. 2, any of devices 304*b*-304*e* of FIG. 3, any of proxy device 420 or a device of edge group 424 of FIG. 4, any of devices 504*a*-504*e* of FIG. 5, any of devices 604*a*-604*e* of FIG. 6, or device 704*g* of FIG. 7.

The UE 1200 may be any mobile or non-mobile computing device, such as, for example, mobile phones, computers, tablets, glasses, XR devices, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204*f* The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200 including DRX as discussed herein.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
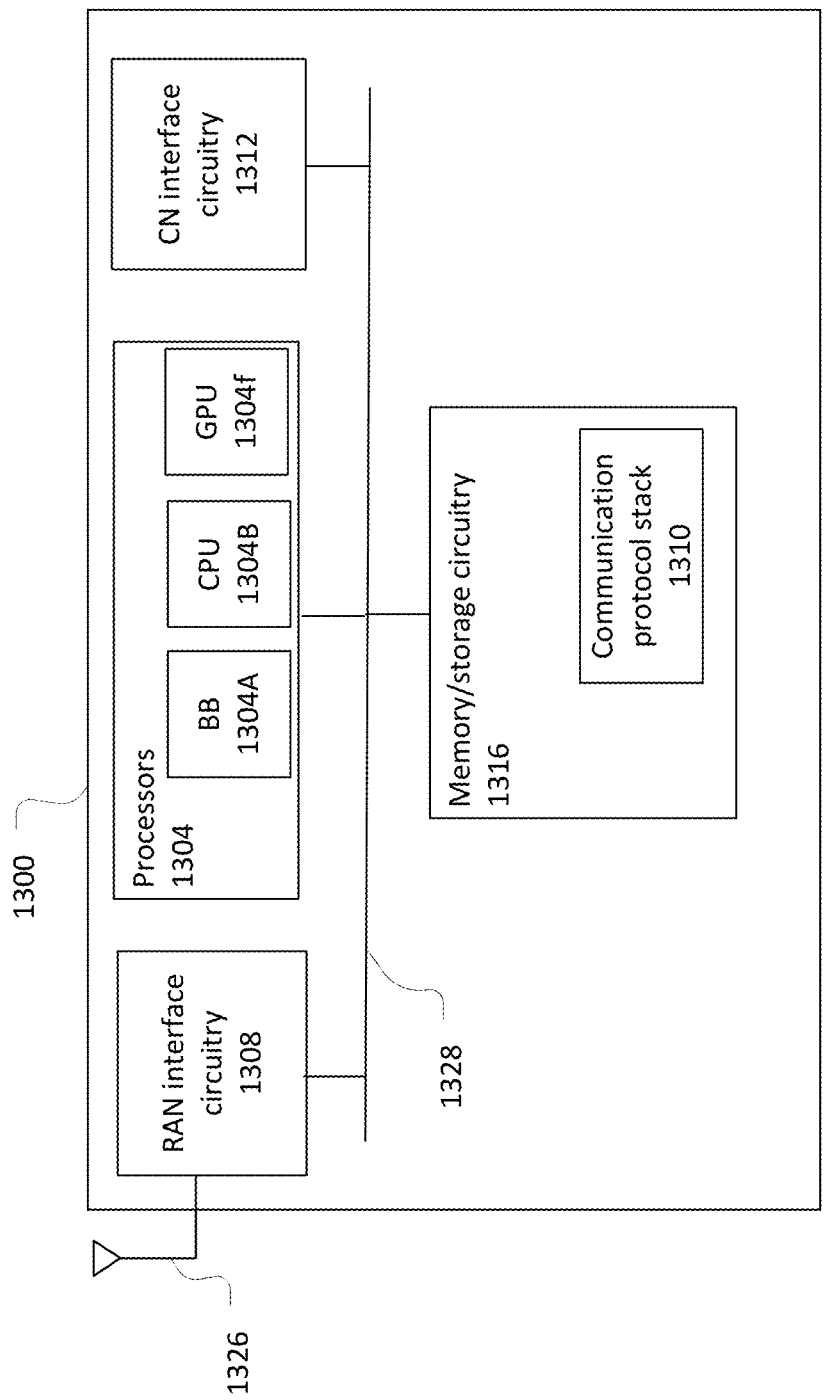
FIG. 13 illustrates a base station in accordance with some embodiments.

FIG. 13 illustrates an access node 1300 (e.g., a base station, such as an eNB or gNB) in accordance with some embodiments. The access node 1300 may be similar to and substantially interchangeable with any of base stations 108, 208a, 208b, 308a, 308b, 508a, 508b, 608a, 608a, or 708a or a base station of RAN 404.

The access node 1300 may include processors 1304, RF interface circuitry 1308, core network (CN) interface circuitry 1312, memory/storage circuitry 1316, and antenna structure 1326.

The components of the access node 1300 may be coupled with various other components over one or more interconnects 1328.

The processors 1304, RF interface circuitry 1308, memory/storage circuitry 1316 (including communication protocol stack 1310), antenna structure 1326, and interconnects 1328 may be similar to like-named elements shown and described with respect to FIG. 12.

The CN interface circuitry 1312 may provide connectivity to a core network, for example, a 5$^{th}$ Generation Core network (5GC) (using a 5GC-compatible network interface protocol such as carrier Ethernet protocols, or some other suitable protocol) or a 4th Generation Core network (evolved packet core or "EPC"; for example, in an E-UTRAN NR—Dual Connectivity (EN-DC) deployment). Network connectivity may be provided to/from the access node 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

Figure 14:
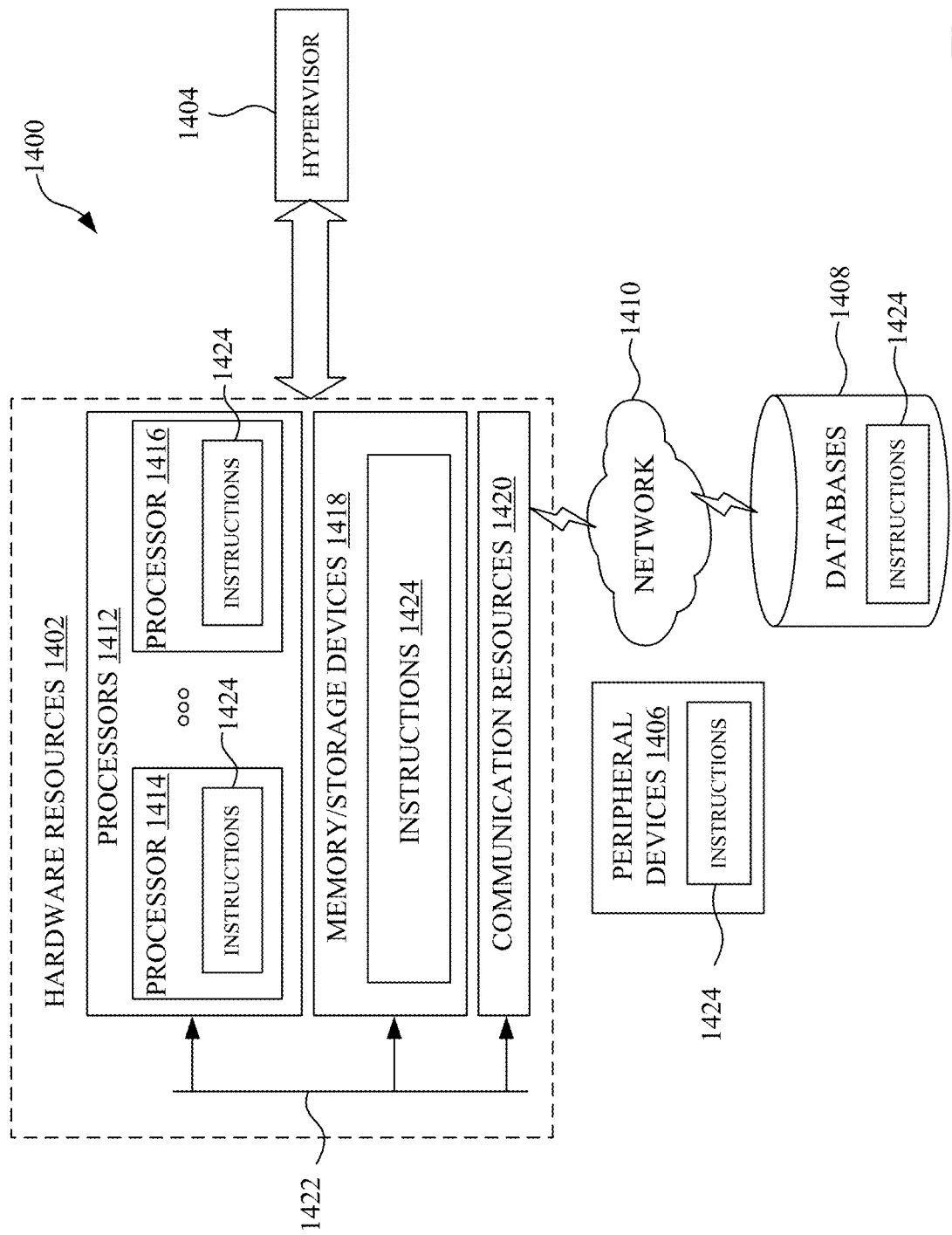
FIG. 14 illustrates components able to read and execute instructions in accordance with some embodiments.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein (e.g., with reference to an edge group services entity). Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402. Components 1400 may be similar to and substantially interchangeable with any of servers 216a, 216b, 224, 232a-c, 316a, 316b, 324, 408, 516a, 516b, 524, 532a-c, 616a, 616b, 624, 632a-c, or 716a.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method of operating a device (e.g., a proxy device), the method comprising: receiving, from an edge group services entity, a request for proxy services; sending, to the edge group services entity and based on the request, a confirmation of proxy services; and based on the request, distributing edge group metadata to at least one device of an edge group.

Example 2 includes the method of Example 1 or some other example herein, wherein receiving the request for proxy services includes receiving the request for proxy services within at least one transmission from a radio access network.

Example 3 includes the method of Example 1 or some other example herein, wherein the request for proxy services identifies a plurality of devices of the edge group.

Example 4 includes the method of Example 1 or some other example herein, wherein the method comprises receiving, from the edge group services entity, a message that includes the request for proxy services and the edge group metadata.

Example 5 includes the method of Example 1 or some other example herein, wherein the method further comprises receiving, from the edge group services entity and subsequent to sending the confirmation of proxy services, the edge group metadata.

Example 6 includes the method of Example 5 or some other example herein, wherein receiving the edge group metadata includes receiving the edge group metadata within at least one transmission from a radio access network.

Example 7 includes the method of Example 1 or some other example herein, wherein the edge group metadata indicates at least one among an IP address of an edge server, a port number of an edge server, a connectivity status of an edge server, and an offloading capability of an edge server.

Example 8 includes the method of Example 1 or some other example herein, wherein the edge group metadata indicates an IP address of an edge application server.

Example 9 includes the method of Example 1 or some other example herein, wherein distributing the edge group metadata to the at least one device of the edge group includes sending the edge group metadata to the at least one device of the edge group over a peer-to-peer connection.

Example 10 includes the method of Example 1 or some other example herein, wherein distributing the edge group metadata to the at least one device of the edge group is performed using network coding.

Example 11 includes a method of operating a device (e.g., a device of an edge group), the method comprising: obtaining edge group metadata provided by a proxy device; based on information within the edge group metadata, causing a device to transmit a message to an edge server; and performing at least one of computation offloading to the edge server or communicating with an application executing on the edge server.

Example 12 includes the method of Example 11 or some other example herein, wherein the method further comprises providing, to an edge group services entity, an indication of a computational capability of the apparatus.

Example 13 includes the method of Example 11 or some other example herein, wherein the method further comprises discontinuing a link to a second edge server.

Example 14 includes the method of Example 11 or some other example herein, wherein the method further comprises periodically awakening a link to a second edge server.

Example 15 includes the method of Example 11 or some other example herein, wherein the method comprises obtaining the edge group metadata over a peer-to-peer connection.

Example 16 includes the method of Example 11 or some other example herein, wherein the method comprises obtaining the edge group metadata by network coding.

Example 17 includes the method of Example 11 or some other example herein, wherein the method comprises obtaining periodic updates of the edge group metadata.

Example 18 includes the method of Example 11 or some other example herein, wherein the edge group metadata indicates at least one among an IP address of an edge server, a port number of an edge server, a connectivity status of an edge server, and an offloading capability of an edge server.

Example 19 includes the method of Example 11 or some other example herein, wherein the edge group metadata indicates an IP address of an edge application server.

Example 20 includes the method of Example 19 or some other example herein, wherein the edge server is the edge application server.

Example 21 includes a method (e.g., a method of operating a network entity), the method comprising: based on an indication of a first device as a proxy device, sending a request for proxy services to the first device; receiving, from the first device, a confirmation of proxy services; and sending, to the first device, edge group metadata for a plurality of devices of an edge group.

Example 22 includes the method of Example 21 or some other example herein, wherein the method further comprises receiving, from a radio access network (RAN), link quality information for each of the plurality of devices of the edge group, the first device being among the plurality of devices; and based on the link quality information, generating the indication of the first device as a proxy device.

Example 23 includes the method of Example 22 or some other example herein, wherein the method comprises receiving the link quality information from the RAN via a user plane function (UPF).

Example 24 includes the method of Example 21 or some other example herein, wherein the method further comprises sending a message to the first device that includes the request for proxy services and the edge group metadata.

Example 25 includes the method of Example 21 or some other example herein, wherein the method comprises sending the edge group metadata to the first device after receiving the confirmation of proxy services.

Example 26 includes the method of Example 21 or some other example herein, wherein the edge group metadata indicates at least one among an Internet Protocol (IP) address of an edge server, a port number of an edge server, a connectivity status of an edge server, and an offloading capability of an edge server.

Example 27 includes the method of Example 21 or some other example herein, wherein the edge group metadata indicates an Internet Protocol (IP) address of an edge application server.

Example 28 includes the method of Example 27 or some other example herein, wherein the method comprises receiving the IP address of the edge application server from a core network (CN) via an application function (AF) or a network exposure function (NEF).

Example 29 includes the method of Example 21 or some other example herein, wherein the method further comprises receiving, from a core network (CN), an indication that the plurality of devices of the edge group are commonly owned.

Example 30 includes the method of Example 21 or some other example herein, wherein the method further comprises receiving, from the RAN, second link quality information for at least one of the plurality of devices of the edge group; and based on the second link quality information, sending a request for proxy services to a second device among the plurality of devices of the edge group, the second device being different than the first device.

Example 31 includes a method of operating a device (e.g., a thin device), the method comprising: receiving edge group metadata; based on the edge group metadata, logging into a virtual replica device executing on an edge application server; based on a user interaction with an application on the device, sending first data to a corresponding application on the virtual replica device; subsequent to sending the first data, receiving second data from the corresponding application; and based on the second data, updating a user interface of the device.

Example 32 includes the method of Example 31 or some other example herein, wherein the edge group metadata indicates at least one among an IP address of an edge server, a port number of an edge server, a connectivity status of an edge server, and an offloading capability of an edge server.

Example 33 includes the method of Example 31 or some other example herein, wherein the edge group metadata indicates an IP address of the edge application server.

Example 34 includes the method of Example 31 or some other example herein, wherein the method further comprises, prior to logging into the virtual replica device, sending a request for computation offloading to the edge application server.

Example 35 includes the method of Example 31 or some other example herein, wherein receiving the edge group metadata includes receiving the edge group metadata within at least one transmission from a radio access network.

Example 36 includes a system (e.g., a framework) comprising: an edge group that includes a plurality of devices; a proxy device to provide edge group metadata to one or more devices of the edge group; and an Edge Group Services Entity to provide the edge group metadata to the proxy device, the Edge Group Services Entity including an Information Control Function that is to receive first information from a radio access network relating to channel link quality; receive second information from an edge server relating to expected throughput, latency, user behavior, or available edge services; and select the proxy device based on the first information and the second information.

Example 37 includes the system of Example 36 or some other example herein, wherein the Information Control Function is to monitor local services and availability of the edge network.

Example 38 includes the system of Example 36 or some other example herein, wherein the Information Control Function is to detect a change over time in the first information or in the second information, and select a different proxy device based on the change.

Example 39 includes the system of Example 36 or some other example herein, wherein the Information Control Function is to select the proxy device based on application criteria.

Example 40 includes the system of Example 36 or some other example herein, wherein the Information Control Function is to select the proxy device based on reference signal received power (RSRP) level.

Example 41 includes the system of Example 36 or some other example herein, wherein the Information Control Function is to select the proxy device based on user behavior.

Example 42 includes the system of Example 36 or some other example herein, wherein the proxy device is registered in advance with the Edge Group Services Entity.

Example 43 includes the system of Example 36 or some other example herein, wherein the proxy device is to provide desired requirements to the Edge Group Services Entity to achieve offloading.

Example 44 includes the system of Example 36 or some other example herein, wherein the proxy device is to signal to the Edge Group Services Entity a desired modulation, rate, or transmit power to successfully offload an application based on current channel conditions.

Example 45 may include an apparatus comprising means to perform one or more elements of a method described in or related to any of examples 1-44, or any other method or process described herein.

Example 46 may include one or more non-transitory computer-readable media comprising instructions to cause an electronic device, upon execution of the instructions by one or more processors of the electronic device, to perform one or more elements of a method described in or related to any of examples 1-44, or any other method or process described herein.

Example 47 may include an apparatus comprising logic, modules, or circuitry to perform one or more elements of a method described in or related to any of examples 1-44, or any other method or process described herein.

Example 48 may include a method, technique, or process as described in or related to any of examples 1-44, or portions or parts thereof.

Example 49 may include an apparatus comprising: one or more processors and one or more computer-readable media comprising instructions that, when executed by the one or more processors, cause the one or more processors to perform the method, techniques, or process as described in or related to any of examples 1-44, or portions thereof.

Example 50 may include a signal as described in or related to any of examples 1-44, or portions or parts thereof.

Example 51 may include a datagram, information element, packet, frame, segment, PDU, or message as described in or related to any of examples 1-44, or portions or parts thereof, or otherwise described in the present disclosure.

Example 52 may include a signal encoded with data as described in or related to any of examples 1-44, or portions or parts thereof, or otherwise described in the present disclosure.

Example 53 may include a signal encoded with a datagram, IE, packet, frame, segment, PDU, or message as described in or related to any of examples 1-44, or portions or parts thereof, or otherwise described in the present disclosure.

Example 54 may include an electromagnetic signal carrying computer-readable instructions, wherein execution of the computer-readable instructions by one or more processors is to cause the one or more processors to perform the method, techniques, or process as described in or related to any of examples 1-44, or portions thereof.

Example 55 may include a computer program comprising instructions, wherein execution of the program by a processing element is to cause the processing element to carry out the method, techniques, or process as described in or related to any of examples 1-44, or portions thereof.

Example 56 may include a signal in a wireless network as shown and described herein.

Example 57 may include a method of communicating in a wireless network as shown and described herein.

Example 58 may include a system for providing wireless communication as shown and described herein.

Example 59 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   processing a request for proxy services received from an edge group services entity, wherein the request for proxy services identifies a plurality of devices of an edge group;
   generating, for transmission to the edge group services entity and based on the request, a confirmation of proxy services; and
   based on the request, distributing edge group metadata to at least one device of the edge group.

2. The method of claim 1, wherein the request is received within at least one transmission from a radio access network.

3. The method of claim 1, further comprising:
   processing a message received from the edge group services entity, the message indicating the request for proxy services and the edge group metadata.

4. The method of claim 1, further comprising:
   processing the edge group metadata, wherein the edge group metadata is received from the edge group services entity subsequent to transmission of the confirmation of proxy services.

5. The method of claim 4, wherein the edge group metadata is received within at least one transmission from a radio access network.

6. The method of claim 1, wherein the edge group metadata indicates at least one among an Internet Protocol (IP) address of an edge server, a port number of an edge server, a connectivity status of an edge server, or an offloading capability of an edge server.

7. The method of claim 1, wherein the edge group metadata indicates an Internet Protocol (IP) address of an edge application server.

8. The method of claim 1, wherein distributing the edge group metadata to the at least one device of the edge group includes outputting the edge group metadata for transmission to the at least one device of the edge group over a peer-to-peer connection.

9. The method of claim 1, wherein said distributing the edge group metadata to the at least one device of the edge group is performed using network coding.

10. An apparatus comprising:
    processing circuitry to:
    process an edge group metadata and a request for proxy services received from an edge group services entity, wherein the request for proxy services identifies a plurality of devices of an edge group;
    generate, for transmission to the edge group services entity and based on the request, a confirmation of proxy services; and
    based on the request, distribute the edge group metadata to at least one device of the edge group; and
    interface circuitry coupled with the processing circuitry to enable communication.

11. The apparatus of claim 10, wherein the processing circuitry is to:
    process the edge group metadata, wherein the edge group metadata is received from the edge group services entity subsequent to transmission of the confirmation of proxy services to the edge group services entity.

12. One or more non-transitory computer-readable media having instructions that, when executed, cause processing circuitry to:
    process a request for proxy services received from an edge group services entity, wherein the request for proxy services identifies a plurality of devices of an edge group;
    generate, for transmission to the edge group services entity and based on the request, a confirmation of proxy services; and
    based on the request, distribute edge group metadata to at least one device of the edge group.

13. The one or more non-transitory computer-readable media of claim 12, wherein the request is received within at least one transmission from a radio access network.

14. The one or more non-transitory computer-readable media of claim 12, wherein the instructions, when executed, further cause the processing circuitry to:
    process a message received from the edge group services entity, the message indicating the request for proxy services and the edge group metadata.

15. The one or more non-transitory computer-readable media of claim 12, wherein the instructions, when executed, further cause the processing circuitry to:
    process the edge group metadata, wherein the edge group metadata is received from the edge group services entity subsequent to transmission of the confirmation of proxy services.

16. The one or more non-transitory computer-readable media of claim 12, wherein the edge group metadata is received within at least one transmission from a radio access network.

17. The one or more computer-readable media of claim 12, wherein the edge group metadata indicates at least one among an Internet Protocol (IP) address of an edge server, a port number of an edge server, a connectivity status of an edge server, or an offloading capability of an edge server.

* * * * *